United States Patent
McCall et al.

(10) Patent No.: US 8,438,915 B2
(45) Date of Patent: May 14, 2013

(54) INSERT ASSEMBLY AND METHOD FOR FLUID FLOW REVERSE ENGINEERING

(75) Inventors: Thomas McCall, Carrollton, TX (US); Robert M. Boland, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 45 days.

(21) Appl. No.: 13/220,239

(22) Filed: Aug. 29, 2011

(65) Prior Publication Data

US 2013/0047714 A1   Feb. 28, 2013

(51) Int. Cl.
*G01M 15/00* (2006.01)

(52) U.S. Cl.
USPC ........................................... 73/112.01

(58) Field of Classification Search ................ 73/112.01
See application file for complete search history.

(56) References Cited

U.S. PATENT DOCUMENTS

| | | | |
|---|---|---|---|
| 6,772,627 B2 * | 8/2004 | Fleming | 73/147 |
| 6,857,325 B2 * | 2/2005 | Sato | 73/861.79 |
| 6,923,051 B2 * | 8/2005 | Fleming | 73/147 |
| 6,941,805 B2 * | 9/2005 | Seidel et al. | 73/170.02 |
| 7,024,929 B2 * | 4/2006 | Fleming et al. | 73/147 |
| 7,685,870 B2 | 3/2010 | Quinn et al. | |
| 7,971,473 B1 * | 7/2011 | Meunier et al. | 73/112.01 |
| 2003/0209084 A1 * | 11/2003 | Fleming | 73/861.74 |
| 2011/0099810 A1 * | 5/2011 | Stankowski et al. | 29/888 |
| 2011/0099821 A1 | 5/2011 | Hong et al. | |

* cited by examiner

*Primary Examiner* — Freddie Kirkland, III
(74) *Attorney, Agent, or Firm* — Kinney & Lange, P.A.

(57) ABSTRACT

A fluid testing apparatus for performing fluid flow analysis on a gas turbine engine component having a plurality of fluid cooling circuits each defining one or more openings in the component includes a first sealing insert configured to create a seal at an interface of the first sealing insert to the component to seal off one or more openings of a first fluid cooling circuit of the component and a generic insert separable from the first sealing insert. The first sealing insert is configured as a substantially flat sheet having a shaped perimeter, and the component is clampable to the generic insert to hold the first sealing insert against the component.

14 Claims, 4 Drawing Sheets

INSERT ASSEMBLY AND METHOD FOR FLUID FLOW REVERSE ENGINEERING

BACKGROUND

The present invention relates to an insert assembly and associated method for reverse engineering processes involving components having fluid openings, and more particularly to an assembly and method for reverse engineering fluid circuits of gas turbine engine components.

Reverse engineering generally describes a process of investigating an existing component (e.g., gas turbine engine component) of which the particular design specifications are not fully understood, usually with the goal of recreating parts having the same or similar configuration and specifications. Gas turbine engine components are often highly complex, with relatively precise tolerances. Such components are often cooled with fluid cooling circuits, which must be reverse engineered to precisely determine fluid flow requirements through each circuit and any associated openings. The particular fluid used for cooling can be air, steam, etc. The nature of fluid flow testing generally necessitates that each fluid circuit be tested separately, in order to obtain accurate measurements for a given circuit without interference from another circuit.

Fluid flow reverse engineering has been performed by blocking or masking fluid flow openings in a component while the component under testing is connected to a fluid supply and test equipment. After a mask is positioned on the component, fluid is then delivered through only a selected one of the cooling circuits and test data is collected. Many tests, generally on a number of similar or identical components are typically performed, and a statistical analysis is then performed in order to establish fluid flow parameters for reverse engineering purposes. Existing masks for this reverse engineering process are typically hand-carved, three-dimensional structures designed to provide a close, sealing fit against the component being tested to seal off all but one fluid circuit. However, fabrication and use of existing masking equipment can be cumbersome, time-consuming, and prone to wear and undesired fluid leakage during testing.

Thus, it is desired to provide an alternative insert or masking assembly and associated method suitable for fluid flow reverse engineering.

SUMMARY

A fluid testing apparatus for performing fluid flow analysis on a gas turbine engine component having a plurality of fluid cooling circuits each defining one or more openings in the component according to the present invention includes a first sealing insert configured to create a seal at an interface of the first sealing insert to the component to seal off one or more openings of a first fluid cooling circuit of the component and a generic insert separable from the first sealing insert. The first sealing insert is configured as a substantially flat sheet having a shaped perimeter, and the component is clampable to the generic insert to hold the first sealing insert against the component.

Figure 1:
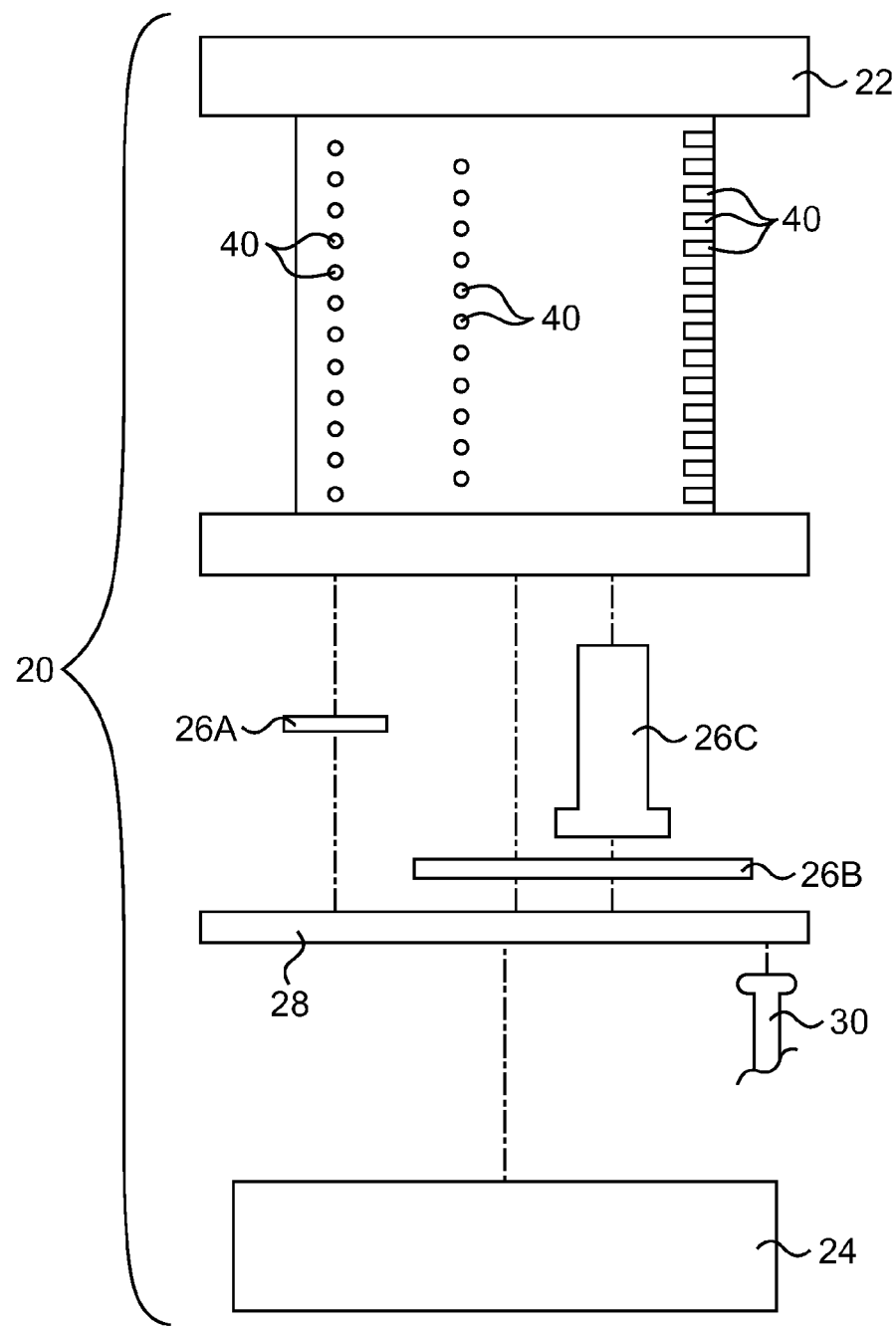
FIG. 1 is an exploded front view of a test assembly of the present invention.

While the above-identified drawing figures set forth an embodiment of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

It may be desired to perform reverse engineering or other testing on a component in order to evaluate fluid flow characteristics. For example, an existing gas turbine engine component, such as a vane, may have various cooling circuits for which the parameters of fluid flow are unknown. The particular fluid involved can vary as desired for particular applications, but commonly is air, steam, etc. It is desired to understand and characterize fluid flows to allow for the fabrication of similar or identical parts. In the gas turbine engine context, applicable regulatory clearance may require that the reverse engineering process provide for relatively precise knowledge of fluid flow parameters for new part validation and approval.

In a typical prior art test apparatus, a component to be analyzed is attached to a fluid supply to enable fluid flow testing. Because a typical fluid cooled gas turbine engine component (e.g., vane) will include multiple cooling circuits, it is desired to isolate a given fluid circuit for testing, in order to minimize influence of other fluid circuits on gathered test data. In the past, a masking insert has been used to mask one or more cooling fluid circuits while testing is performed on a given circuit. However, these masking inserts have generally required a relatively complex three-dimensional shape, which is typically produced manually by hand-carving. Handmade masking inserts are time-consuming and expensive to fabricate. Damage or wear to the insert can lead to fluid leakage, which hampers test data collection and can necessitate replacement of the masking insert. For instance, repeated testing is usually required, and repeated placement and removal of a masking insert can lead to wear at sealing surfaces, which in turn can produce fluid leakage at the corresponding sealing interface. However, because of the three-dimensional shape of the inserts, the present inventors have found that inspection of seals formed between the insert and the component are not accessible (e.g., not visible) in situ, which makes it difficult to precisely identify when a given prior art masking insert is leaking fluid or otherwise in need of replacement. Sacrificial inserts disclosed in U.S. Pat. No. 7,685,870 account for portions of the masking insert prone to damage by certain sharp edges of the component under testing, but are still configured in complex three-dimensional shapes that make inspection of sealing relationships difficult or impossible.

Those of ordinary skill in the art will appreciate that the present invention provides an alternative method and apparatus for fluid testing. Numerous advantages and benefits of the present invention will be appreciated in view of the description that follows and the accompanying figures.

Figure 2:
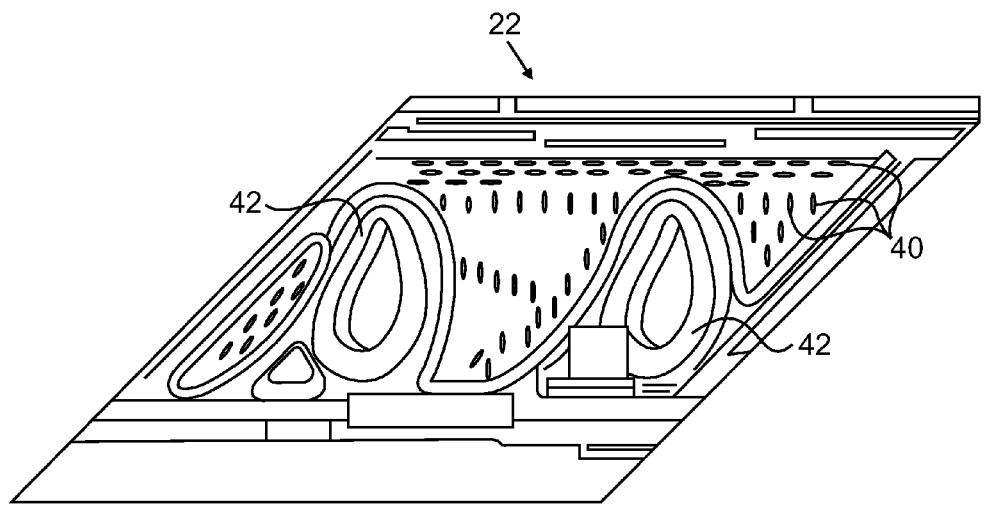
FIG. 2 is a top view of a component for testing with the test assembly of FIG. 1.
Figure 4:
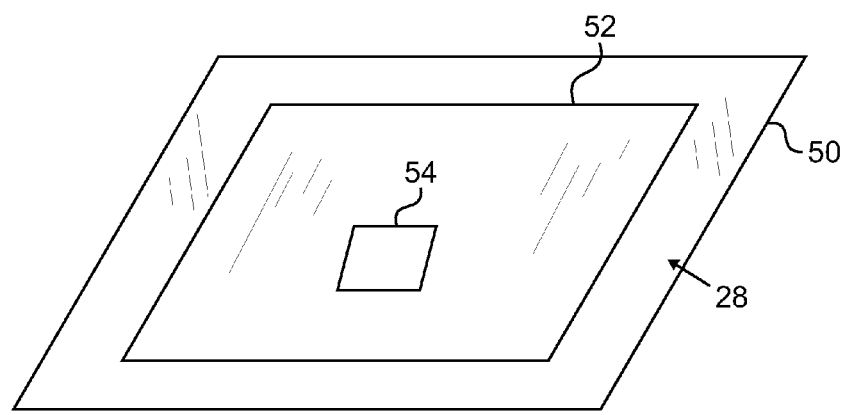
FIG. 4 is a bottom view of a generic insert of the test assembly of FIG. 1.
Figure 3A:
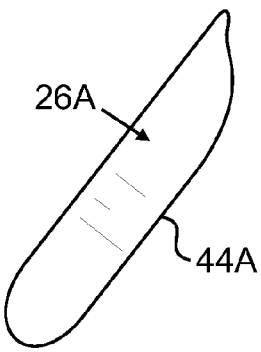
FIGS. 3A and 3B are plan views of sealing inserts of the test assembly of FIG. 1.
Figure 3B:
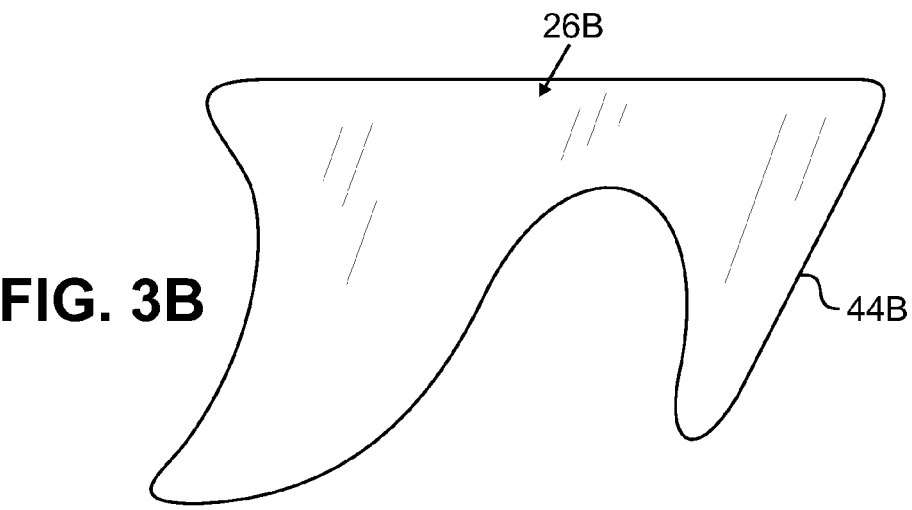
Figure 3C:
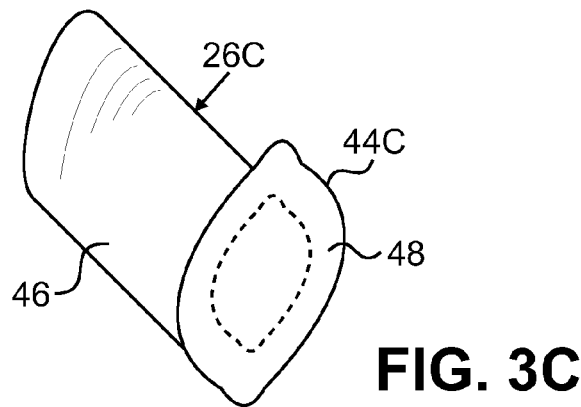
FIG. 3C is a perspective view of another sealing insert of the test assembly of FIG. 1.

FIG. 1 is an exploded front view of an embodiment of a test assembly 20, which includes a component (e.g., a gas turbine engine vane) 22, a fluid supply assembly 24, first, second and third sealing inserts 26A-26C, a generic insert 28, and a clamp 30. FIG. 2 is a top view of the component 22, FIGS. 3A and 3B are plan views of the sealing inserts 26A and 26B, respectively, FIG. 3C is a perspective view of the sealing insert 26C, and FIG. 4 is a bottom view of the generic insert 28. It should be noted that the illustrated embodiments are shown by way of example and not limitation. Various alternative configurations are possible in further embodiments. For example, while the illustrated component 22 resembles a gas turbine engine vane segment, in further embodiments the component 22 could be a blade, shroud, or nearly any other type of component with one or more fluid circuits. Moreover, the test assembly 20 can be used in conjunction with other equipment not specifically shown or described.

The component 22 of the illustrated embodiments (see FIGS. 1 and 2) defines a plurality of discrete cooling fluid circuits that provide cooling fluid flows during operation to provide film cooling, convective cooling, impingement cooling, and/or other types of cooling. Openings 40 are formed in various portions of the component 22 to allow the inflow and outflow of a cooling fluid, such as air, steam, etc. Baffles 42 can also be present, which are used to direct cooling fluid flow, such as for impingement cooling. In some components, such as gas turbine engine vanes, baffles are provided extending into inner cavities of airfoils at either end of the airfoil to provide cooling to separate locations, such as the leading and trailing edges of the associated airfoil.

The fluid supply 24 can be a conventional fluid supply, or can have essentially any desired configuration for selectively delivering a fluid for testing purposes. The fluid supply 24 is shown without much detail in FIG. 1.

The sealing inserts 26A-26C, embodiments of which are shown in detail in FIGS. 3A-3C, can be configured to each seal against selected portions of the component 22 at respective sealing interfaces, so as to seal off some or all of a cooling fluid circuit of the component 22. For instance, the sealing inserts 26A and 26B can be positioned to seal off openings 40 in an inner or outer platform of a vane. The sealing inserts 26A and 26B in the illustrated embodiment are each generally flat, planar and sheet-like, with a substantially two-dimensional configuration that defines a shaped perimeter 44A and 44B, respectively. The perimeters 44A and 44B generally correspond to the shape of selected regions of the component 22, such as to allow the sealing inserts 26A and 26B to mask and sealingly cover given sets of the openings 40. The sealing insert 26C has a three-dimensional shape, with a body portion 46 and a flange portion 48. The flange portion 48 has a perimeter 44C and can be wider than the body portion 46, as shown in the illustrated embodiment. The sealing insert 26C can be configured to be at least partially inserted into a baffle 42, in order to create a seal with openings (not visible in the figures) along interior surfaces of the baffle 42. Furthermore, the flange portion 48 can create a seal along end surfaces of the baffle 42, typically at or near a location where the baffle 42 is welded or otherwise secured to the adjacent portions of the component 22. The flange portion 48 generally helps prevent delivered cooling fluid from entering the baffle 42 through an inlet opening during testing, while the body portion 46 helps prevent fluid from entering the baffle 42 through outlet openings (not visible in the figures).

The generic insert 28 (see FIGS. 1 and 4) is generally configured to simultaneously cover and help secure all of the sealing inserts 26A-26C at a given side of the component 22. In the illustrated embodiment, the generic insert 28 is generally planar and sheet-like, with a perimeter 50 that generally corresponds to an overall perimeter of the component 22 (e.g., a trapezoidal shape that corresponds to the shape of a platform of a gas turbine engine vane) and a shallow depression 52 that can facilitate acceptance of the sealing inserts 26A-26C. The depression 52 is optional, and can be omitted in further embodiments. An opening 54 can be provided to allow fluid supplied by the fluid supply 24 to pass through the generic insert 28 to a desired fluid circuit of the component 22 during testing.

As shown in FIG. 1, the sealing inserts 26A-26C are each placed at selected locations of the component 22, and the generic insert 28 is positioned over the sealing inserts 26A-26C, with the sealing inserts 26A-26C generally in between the generic insert 28 and the component 22. The clamp 30 can be used to apply a force to hold the generic insert 28 relative to the component 22, with the generic insert 28 in turn holding the sealing inserts 26A-26C in a sealing relationship against the component 22. The fluid supply 24 can be positioned against the generic insert 28, and a suitable fluid flow provided from the fluid supply 24 through the opening 54 in the generic insert 28 to a desired fluid circuit of the component 22, with the sealing inserts 26A-26C sealing off fluid flow from one or more additional fluid circuits of the component 22. It should be noted that the particular configuration of the sealing inserts 26A-26C and the generic insert 28 can vary for particular applications, in order to function with a desired component 22. The number and shapes of the inserts of the test assembly 20 in particular will vary, as will the particular locations on the component at which those inserts are placed for testing.

Because the generic insert 28 is a separate component independent and separable from the sealing inserts 26A-26C, it is relatively easy to inspect a sealing interface between any of the sealing inserts 26A-26C and the component 22. Such sealing interfaces are typically formed at or near the perimeter 44A-44C of the respective sealing insert 26A-26C.

When the sealing inserts 26A-26C exhibit wear or damage, they can be individually replaced as needed, without a need to replace all of the sealing inserts 26A-26C or the generic insert 28. The sealing inserts can be fabricated from a sheet of material and stamped or cut to a desired size and shape using one or more cuts. The sealing inserts 26A-26C and the generic insert 28 can be made of a conformable material, such as rubber or silicone polymers.

Figure 5:
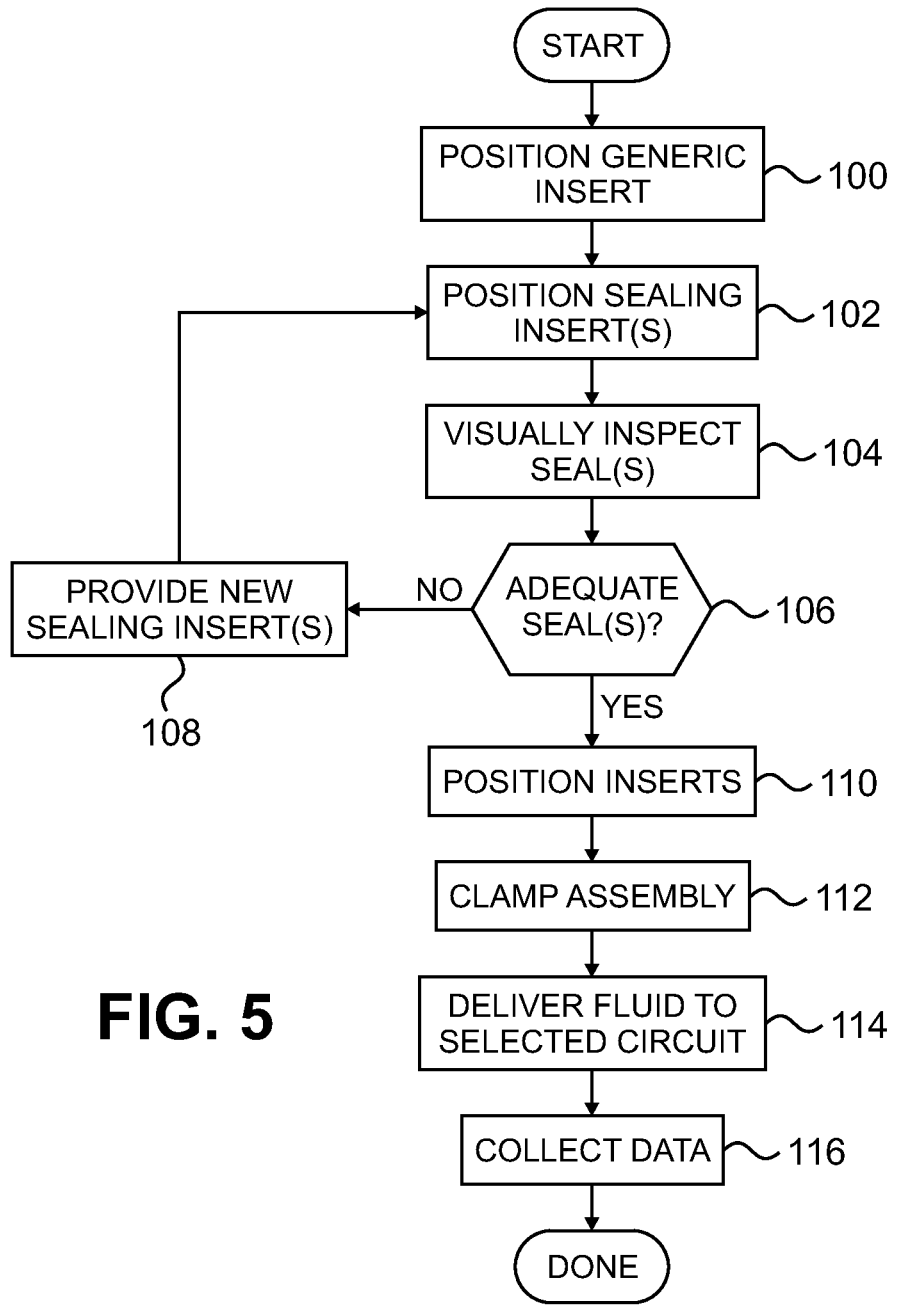
FIG. 5 is a flow chart of a reverse engineering method of the present invention.

FIG. 5 is a flow chart of a reverse engineering method that can be performed using the test assembly 20. Initially, the generic insert 28 can be positioned in the fluid supply assembly 24 (step 100). One or more of the sealing inserts 26A-26C are positioned at selected locations on the component 22 to help mask or seal off at least part of one or more fluid circuits of the component 22 (step 102). In some embodiments, multiple sealing inserts 26A-26C are used in conjunction to seal off different portions of a given fluid circuit, such that the entire fluid circuit is sealed off from fluid flow. Typically, at least one fluid circuit is left at least partially unsealed. Once the sealing inserts 26A-26C are positioned, a sealing relationship at an interface of each sealing insert 26A-26C to the component 22 can be inspected (step 104). In one embodiment, the sealing relationships are inspected visually, such as to identify gaps, areas or wear or other sealing defects. In alternative embodiments, other suitable inspection procedures can be used. A determination is then made with respect to each of the sealing inserts 26A-26C to determine whether an adequate seal is formed (step 106). If sealing is not adequate for any of the sealing inserts 26A-26C, a new or replacement sealing insert can be provided (step 108). As many or few of the sealing inserts 26A-26C can be replaced as necessary in view of the inspection determination. Generally, only the sealing inserts 26A-26C that do not provide an adequate seal are replaced, though any desired number of the sealing inserts 26A-26C can be replaced at any given time. After replacement of sealing inserts at step 108, the replacement sealing insert is positioned and the process returns to step 102 described above.

Once adequate seals are provided, the component 22 and the seal inserts 26A-26C can be positioned relative to the generic insert 28 (step 110). Generally, the generic insert 28 is positioned over and in physical contact with the sealing inserts 26A-26C, with the sealing inserts 26A-26C generally located in between the generic insert 28 and the component 22. The component 22 can then be clamped relative to the generic insert 28 (step 112). In this way, the clamp 30 can apply a force between the generic insert 28 and the component 22, with the generic insert 28 in turn helping to simultaneously hold the sealing inserts 26A-26C in a sealing relationship against the component 22. The particular location of the clamp 30 can vary as desired for particular applications.

Next, fluid can be supplied to a selected fluid circuit of the component 22 using the fluid supply assembly 24 (step 114). With fluid being supplied, fluid flow data can be collected suing suitable sensors or other equipment (step 116).

The method illustrated in FIG. 5 can be repeated any number of times to gather a sufficient amount of test data. Typically the same tests are performed on a sample or numerous physically different components of ostensibly the same configuration, in order to gather sufficient data to account for manufacturing tolerance variations and the like. Furthermore, similar testing as illustrated in FIG. 5 can be performed by masking different fluid circuits of the component 22, with the testing process performed in substantially the same manner for each circuit of the component 22. Once a suitable amount of data has been collected, a statistical analysis can be performed in order to characterize the characteristics of the component 22 and associated fluid flow parameters. Subsequently, that analysis can be applied to create design specifications for a reverse engineered part of the same or similar configuration to the component 22 under testing, and in turn reverse engineered components can be fabricated according to the reverse engineering design specifications.

It should be noted that embodiment of the method illustrated in FIG. 5 is provided by way of example and not limitation. The method of the present invention can be performed in conjunction with additional steps not specifically shown. Moreover, the order of steps can be altered as desired for particular applications.

Any relative terms or terms of degree used herein, such as "substantially", "approximately", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid testing apparatus for performing fluid flow analysis on a gas turbine engine component having a plurality of fluid cooling circuits each defining one or more openings in the component, that apparatus comprising:
   a first sealing insert configured to create a seal at an interface of the first sealing insert to the component to seal off one or more openings of a first fluid cooling circuit of the component, wherein the first sealing insert is configured as a substantially flat sheet having a shaped perimeter;
   a baffle insert configured to sealingly extend into a cooling baffle of the component to create a seal along at least one interior surface of the baffle; and
   a generic insert separable from the first sealing insert, wherein the component is clampable to the generic insert to hold the first sealing insert and the baffle insert relative to the component.

2. The apparatus of claim 1 and further comprising:
   a fluid supply configured to provide fluid to a selected fluid cooling circuit of the component.

3. The apparatus of claim 2, wherein the fluid supply is configured to supply air.

4. The apparatus of claim 1, wherein the generic component includes a depression.

5. The apparatus of claim 1 and further comprising:
   a second sealing insert configured to create a seal at an interface of the second sealing insert to the component to seal off one or more openings of a second fluid cooling circuit of the component, wherein the second sealing insert is configured as a substantially flat sheet having a shaped perimeter, and wherein the generic insert holds both the first sealing insert and the second sealing insert against the component.

6. A method of reverse engineering a component having a plurality of fluid cooling circuits, the method comprising:
   positioning a first sealing insert to sealingly mask fluid openings of a first one of the fluid cooling circuits of the component;
   inspecting the sealing relationship at an interface of the first sealing insert to the component;
   positioning a generic insert over the first sealing insert;
   clamping the generic insert to the component, wherein the clamped generic insert holds the first sealing insert against the component;
   connecting a fluid supply in fluid communication with a second one of the fluid cooling circuits of the component; and
   performing a fluid flow test on the second of the fluid cooling circuits of the component using the fluid supply.

7. The method of claim 6 and further comprising:
   positioning a second sealing insert to sealingly mask a third one of the fluid cooling circuits of the component, wherein the clamped generic insert holds the second sealing insert against the component.

8. The method of claim 7 and further comprising:
   inspecting the sealing relationship at an interface of the second sealing insert to the component.

9. The method of claim 6 and further comprising:
   creating the first sealing insert from a sheet of material with one or more cuts.

10. A fluid testing apparatus for performing fluid flow analysis on a gas turbine engine component having a plurality of fluid cooling circuits each defining one or more openings in the component, that apparatus comprising:

- a first sealing insert configured to create a seal at an interface of the first sealing insert to the component to seal off one or more openings of a first fluid cooling circuit of the component, wherein the first sealing insert is configured as a substantially flat sheet having a shaped perimeter;
- a second sealing insert configured to create a seal at an interface of the second sealing insert to the component to seal off one or more openings of a second fluid cooling circuit of the component, wherein the second sealing insert is configured as a substantially flat sheet having a shaped perimeter; and
- a generic insert separable from the first sealing insert, wherein the component is clampable to the generic insert to hold the first sealing insert and the second sealing insert against the component.

11. The apparatus of claim 10 and further comprising:
a baffle insert configured to sealingly extend into a cooling baffle of the component, wherein the generic insert is configured to hold the baffle insert against the component.

12. The apparatus of claim 10 and further comprising:
a fluid supply configured to provide fluid to a selected fluid cooling circuit of the component.

13. The apparatus of claim 12, wherein the fluid supply is configured to supply air.

14. The apparatus of claim 10, wherein the generic component includes a depression.

* * * * *